(12) United States Patent
Li

(10) Patent No.: US 8,480,116 B2
(45) Date of Patent: Jul. 9, 2013

(54) INFANT CARRIER APPARATUS HAVING AN ADJUSTABLE HANDLE ASSEMBLY

(75) Inventor: Fang Ming Li, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 224 days.

(21) Appl. No.: 12/967,449

(22) Filed: Dec. 14, 2010

(65) Prior Publication Data

US 2011/0148059 A1 Jun. 23, 2011

(30) Foreign Application Priority Data

Dec. 18, 2009 (CN) .......................... 2009 1 0258823

(51) Int. Cl.
*B62B 1/04* (2006.01)
(52) U.S. Cl.
USPC ........... 280/643; 280/648; 280/649; 280/650; 280/658; 280/47.38
(58) Field of Classification Search
USPC ................. 280/642–644, 647–650, 657–658, 280/47.38–47.41
See application file for complete search history.

(56) References Cited

U.S. PATENT DOCUMENTS

| | | | |
|---|---|---|---|
| 4,191,397 A * | 3/1980 | Kassai | ........................... 280/647 |
| 4,832,361 A | 5/1989 | Nakao et al. | |
| 6,116,624 A | 9/2000 | Hu | |
| 6,508,605 B1 | 1/2003 | Cheng | |
| 6,530,591 B2 | 3/2003 | Huang | |
| 6,824,161 B2 | 11/2004 | Iwata | |
| 6,830,254 B2 | 12/2004 | Lan | |
| 6,851,700 B2 | 2/2005 | Yoshie et al. | |
| 6,951,342 B2 | 10/2005 | Lan | |
| 7,021,650 B2 | 4/2006 | Chen | |
| 7,273,225 B2 | 9/2007 | Yeh | |
| 7,401,803 B1 | 7/2008 | Lai | |
| 7,513,512 B2 | 4/2009 | Yoshie et al. | |

FOREIGN PATENT DOCUMENTS

| | | |
|---|---|---|
| CN | 95211826 | 7/1995 |
| CN | 200420083534 | 9/2004 |
| CN | 200520003600 X | 2/2005 |
| CN | 200520055399 | 3/2005 |
| CN | 200620165613 | 12/2006 |
| CN | 1919796 C | 6/2007 |
| CN | 201077473 Y | 6/2008 |

(Continued)

*Primary Examiner* — Jeffrey J Restifo
*Assistant Examiner* — Erez Gurari
(74) *Attorney, Agent, or Firm* — David I. Roche; Baker & McKenzie LLP

(57) ABSTRACT

An infant carrier apparatus comprises a support frame, a handle assembly having two side segments, two handle adjusting mechanisms pivotally connecting the two side segments of the handle assembly with the support frame, a release actuator and two transmission elements. Each of the handle adjusting mechanisms has a locked state for securely holding the handle assembly in place relative to the support frame, and an unlocked state allowing rotation of the handle assembly about a pivot axis relative to the support frame. Each of the transmission elements has a first and second distal end, wherein the first distal end is connected with one of the handle adjusting mechanisms, and the second distal end is connected with the release actuator. The release actuator is operable to switch the handle adjusting mechanisms from the locked state to the unlocked state.

20 Claims, 9 Drawing Sheets

FOREIGN PATENT DOCUMENTS

| | | |
|---|---|---|
| CN | 201154720 Y | 11/2008 |
| CN | 101553391 A | 10/2009 |
| EP | 1693277 A2 | 8/2006 |
| EP | 1970284 A2 | 9/2008 |
| TW | 290120 M | 11/1994 |
| TW | 275137 | 4/2005 |

* cited by examiner

INFANT CARRIER APPARATUS HAVING AN ADJUSTABLE HANDLE ASSEMBLY

CROSS-REFERENCE TO RELATED APPLICATION

This application claims priority to China Patent Application No. 200910258823.3 filed on Dec. 18, 2009.

BACKGROUND

1. Field of the Invention

The present invention relates to an infant carrier apparatus, and more particularly to an infant carrier apparatus having an adjustable handle assembly.

2. Description of the Related Art

A stroller apparatus typically comprises a support frame provided with wheels, a seat assembly and a handle assembly. After a child is placed in the seat, the parent can use the handle to push the stroller in movement. In traditional strollers, the seat assembly is usually oriented toward the front of the stroller in its direction of displacement. Because the child does not face the parent when seated in the stroller, no interaction is permitted between the child and the parent. To remedy this deficiency, some current approaches propose a stroller structure in which the orientation of the handle assembly can be adjusted back and forth, whereby the child can also be seated facing the parent. However, the hinges for pivoting the handle assembly are usually complex in construction and may not be convenient to operate.

Therefore, there is a need for an infant carrier apparatus that can be fabricated in a cost-effective manner, easy to operate and address at least the foregoing issues.

SUMMARY

The present application describes an infant carrier apparatus provided with a release actuator and handle adjusting mechanisms that permit convenient operation of a handle assembly.

In one embodiment, the infant carrier apparatus comprises a support frame, a handle assembly having two side segments, two handle adjusting mechanisms pivotally connecting the two side segments of the handle assembly with the support frame, a release actuator and two transmission elements. Each of the handle adjusting mechanisms has a locked state for securely holding the handle assembly in place relative to the support frame, and an unlocked state allowing rotation of the handle assembly about a pivot axis relative to the support frame. Each of the transmission elements has a first and second distal end, wherein the first distal end is connected with one of the handle adjusting mechanisms, and the second distal end is connected with the release actuator. The release actuator is operable to switch the handle adjusting mechanisms from the locked state to the unlocked state.

At least one advantage of the structures described herein is the ability to use one single hand for operating the release actuator for unlocking the handle adjusting mechanisms in a concurrent manner. As a result, adjustment of the handle assembly can be more convenient to operate.

DETAILED DESCRIPTION OF THE EMBODIMENTS

Figure 1:
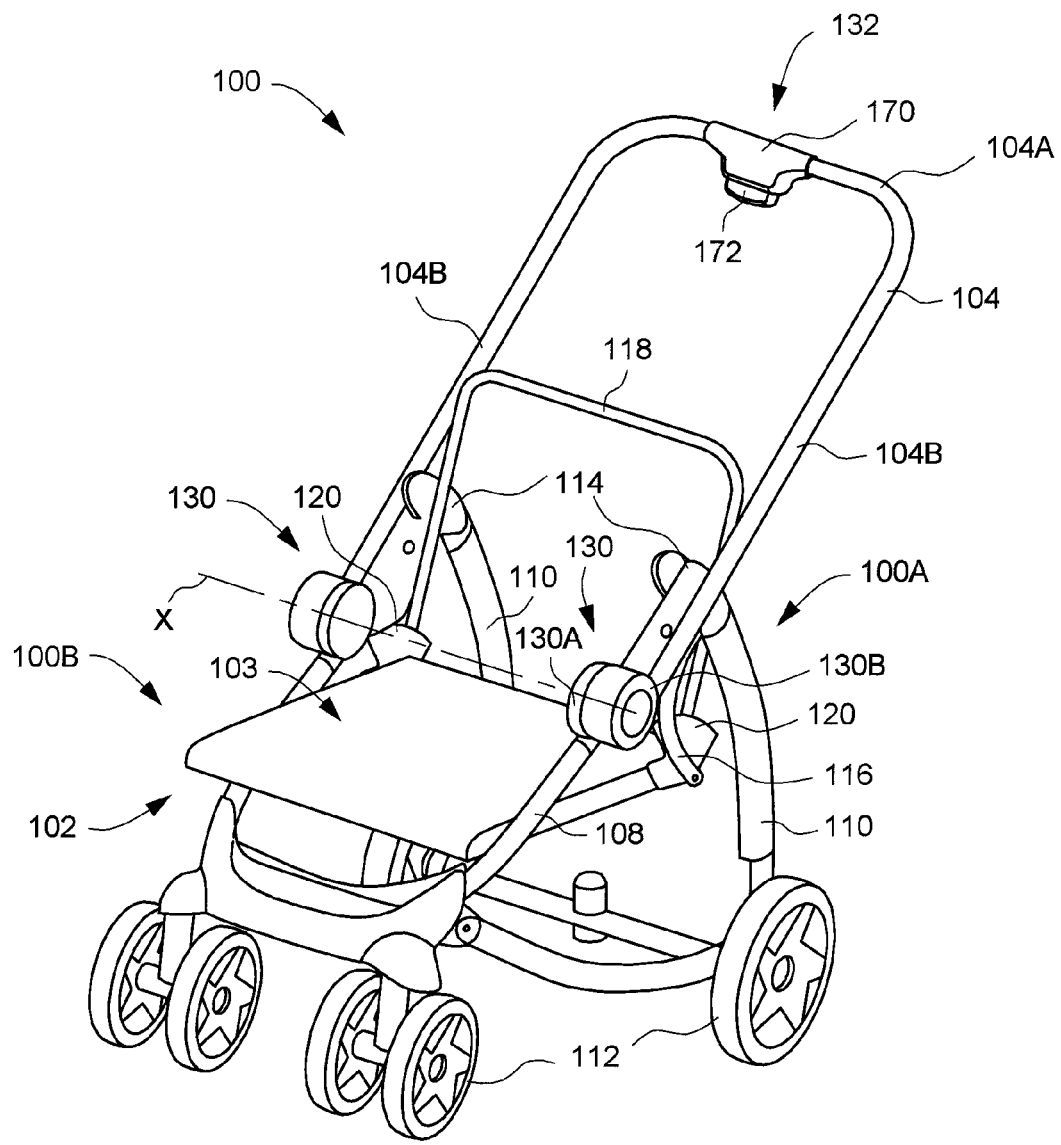
FIG. 1 is a perspective view illustrating an embodiment of an infant carrier apparatus.
Figure 2:
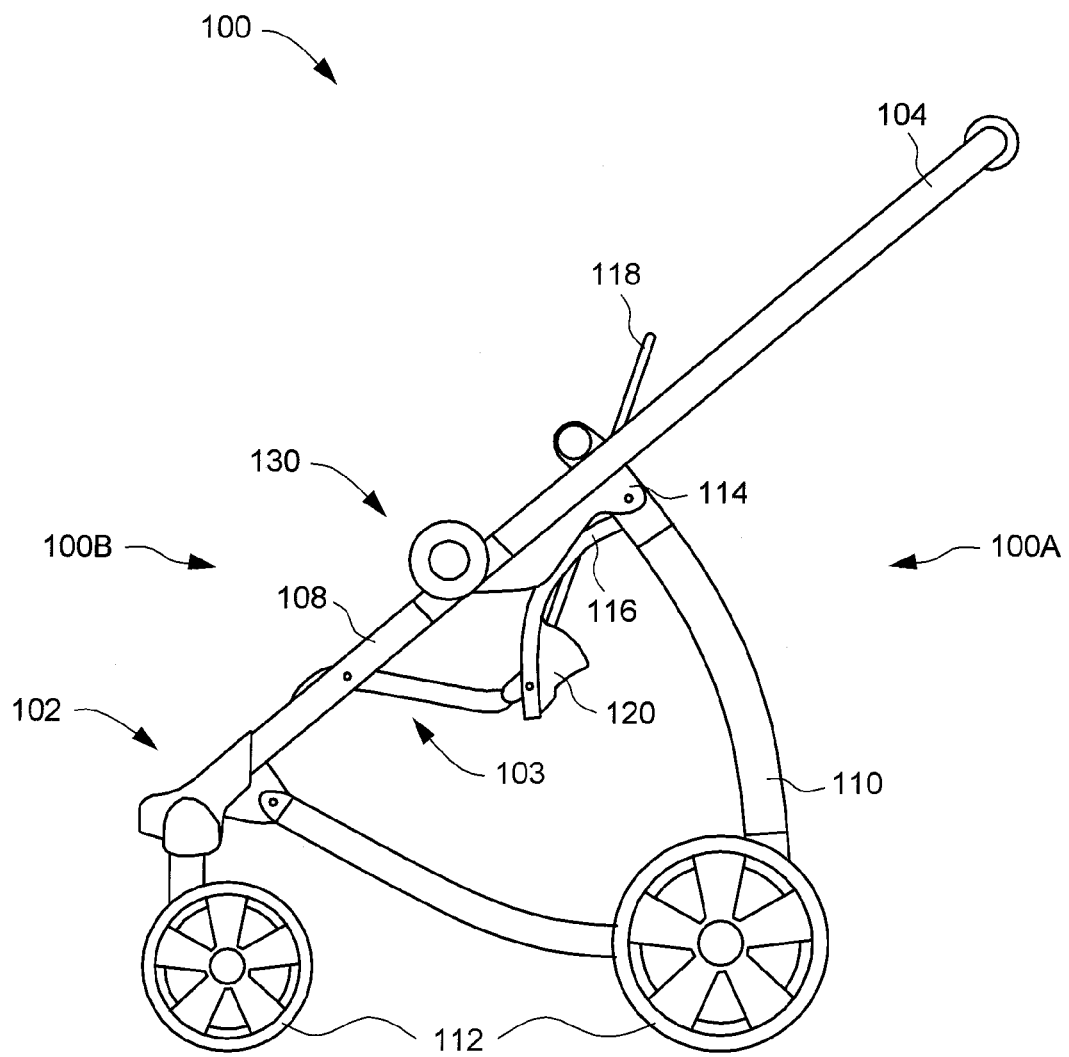
FIG. 2 is a side view of the infant carrier apparatus shown in FIG. 1.

FIGS. 1 and 2 are respectively perspective and side views illustrating an embodiment of an infant carrier apparatus 100, which is exemplary an infant stroller. The infant carrier apparatus 100 can comprise a support frame 102, a seat assembly 103 mounted with the support frame 102, and a handle assembly 104. The support frame 102 can include a front leg frame 108 and a rear leg frame 110. A plurality of wheels 112 can also be provided at lower ends of the front and rear leg frames 108 and 110, so that the infant carrier apparatus 100 can be driven to move toward a first side 100A and second side 100B.

Left and right upper ends of the front and rear leg frame 108 and 110 can be respectively connected with each other via a coupling structure 114. In one embodiment, each of the coupling structures 114 can exemplary have an end affixed with the front leg frame 108, and an opposite end pivotally connected with the rear leg frame 110. The front and rear leg frame 108 and 110 can thereby fold for convenient storage, and deploy for use.

The seat assembly 103 can be supported between the front and rear leg frame 108 and 110. In one embodiment, the seat assembly 103 can include a seat frame, and a cushion arranged on the seat frame. However, the seat assembly 103 is not limited to the aforementioned construction, and may also be formed from a seat board, or the seat assembly 103 with a fabric element. A front end of the seat assembly 103 may be connected with the front leg frame 108, whereas a rear end of the seat assembly 103 may be connected with the rear leg frame 110 via a link bar 116.

In addition, the seat assembly 103 can also comprise a generally U-shaped backrest support 118 having left and right side segments respectively connected with an adjusting mechanism 120. The backrest support 118 can be thereby adjusted forward and backward to a desired inclination relative to the seat assembly 103.

Referring again to FIG. 1, the handle assembly 104 has a generally U-shape that can be formed from the assembly of one or multiple tubular segments. The handle assembly 104 can comprise a transverse segment 104A that can be grasped by a user's hand for pushing the infant carrier apparatus 100, and two side segments 104B respectively joined with two opposite ends of the transverse segment 104A. Two handle adjusting mechanisms 130 can also be arranged at symmetrical positions on left and right upper ends of the front leg frame 108 for pivotally connecting the front leg frame 108 with the side segments 104B of the handle assembly 104. Accordingly, the handle assembly 104 can be pivotally adjusted relative to the support frame 102 to different inclinations.

Each of the two handle adjusting mechanisms 130 has a same construction, including first and second coupling elements 130A and 130B pivotally connected with each other. More specifically, the first coupling element 130A can be affixed with an upper end of the front leg frame 108, whereas the second coupling element 130B can be affixed with a lower end of the side segment 104B, such that the second coupling element 130B and the handle assembly 104 can rotate about a pivot axis X defined by the handle adjusting mechanism 130 relative to the first coupling element 130A and the support frame 102. According to one embodiment, the first coupling element 130A can be formed integral with one coupling structure 114 in a single body for facilitating the assembly of the infant carrier apparatus 100.

Figure 7:
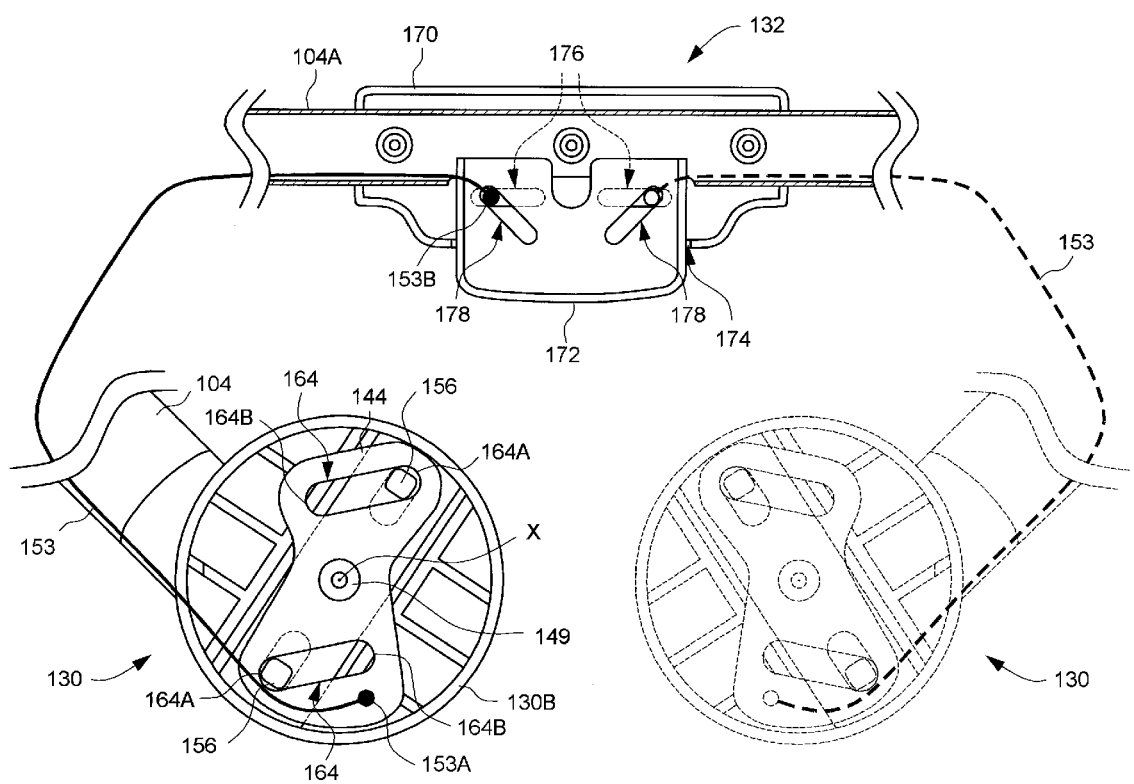
FIG. 7 is a schematic view illustrating the connection between the handle adjusting mechanisms and a release actuator.

Moreover, each handle adjusting mechanism 130 can be respectively connected with a release actuator 132 via an associated transmission element 153 (better shown in FIG. 7). In one embodiment, the release actuator 132 can be provided on the transverse segment 104A of the handle assembly 104 for ease of use. The release actuator 132 can be operated to switch the handle adjusting mechanisms 130 from a locked state to an unlocked state.

Figure 3:
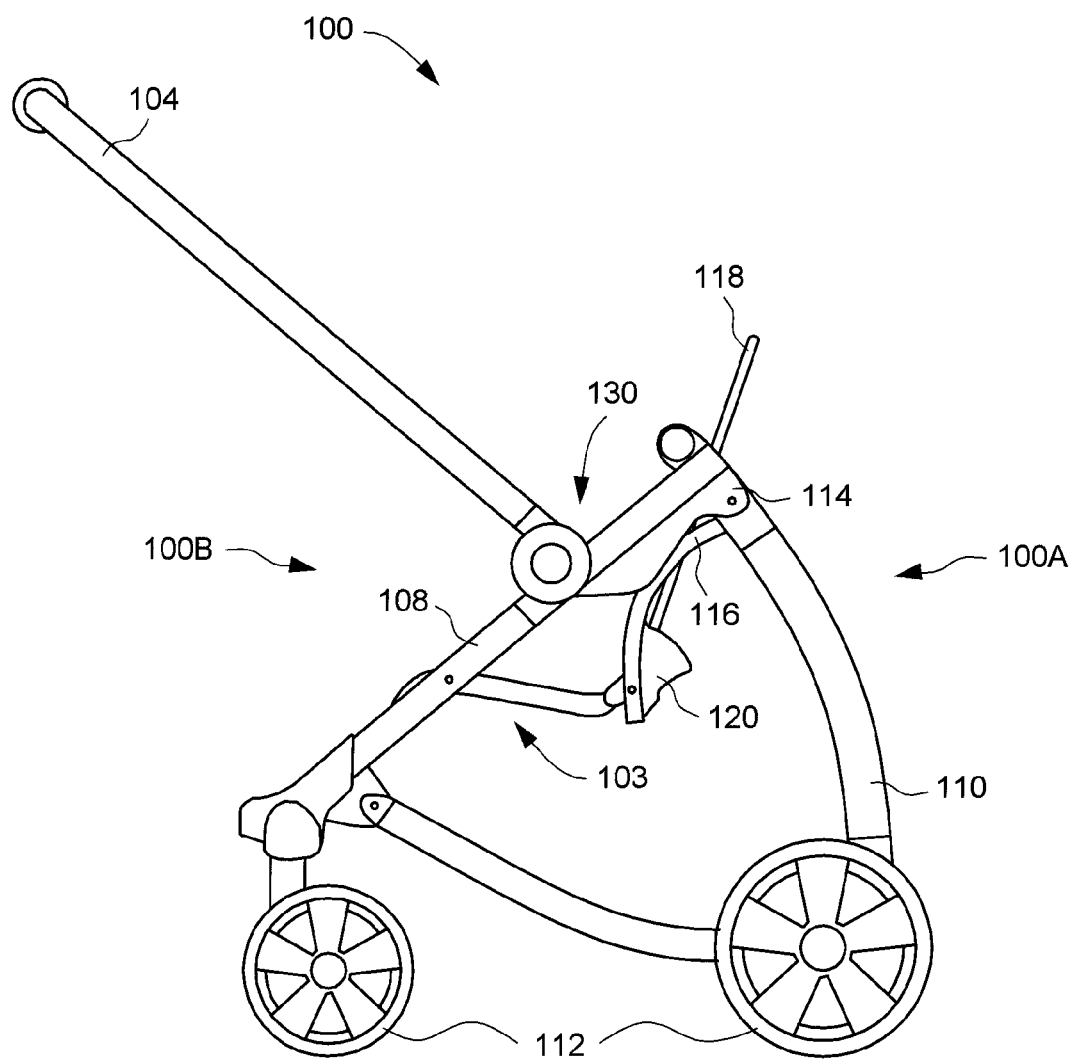
FIG. 3 is a side view illustrating the adjustment of a handle assembly in the infant carrier apparatus of FIG. 1.

FIG. 3 is a side view illustrating the adjustment of the handle assembly 104. Once the handle adjusting mechanisms 130 are switched to the unlocked state, the handle assembly 104 can be adjustably pivoted about the pivot axis X relative to the support frame 102. As shown in FIGS. 2 and 3, the handle assembly 104 can be exemplary adjusted to a first position inclined toward the first side 100A of the infant carrier apparatus 100 (FIG. 2), and a second position inclined toward the second side 100B of the infant carrier apparatus 100 (FIG. 3). Once the handle assembly 104 has been adjusted to the desired position, the handle adjusting mechanisms 130 can recover the locked state for fixedly holding the handle assembly 104 in place relative to the support frame 102. Accordingly, the handle assembly 104 can be desirably adjusted for seating the child either facing forward or rearward.

Figure 4:
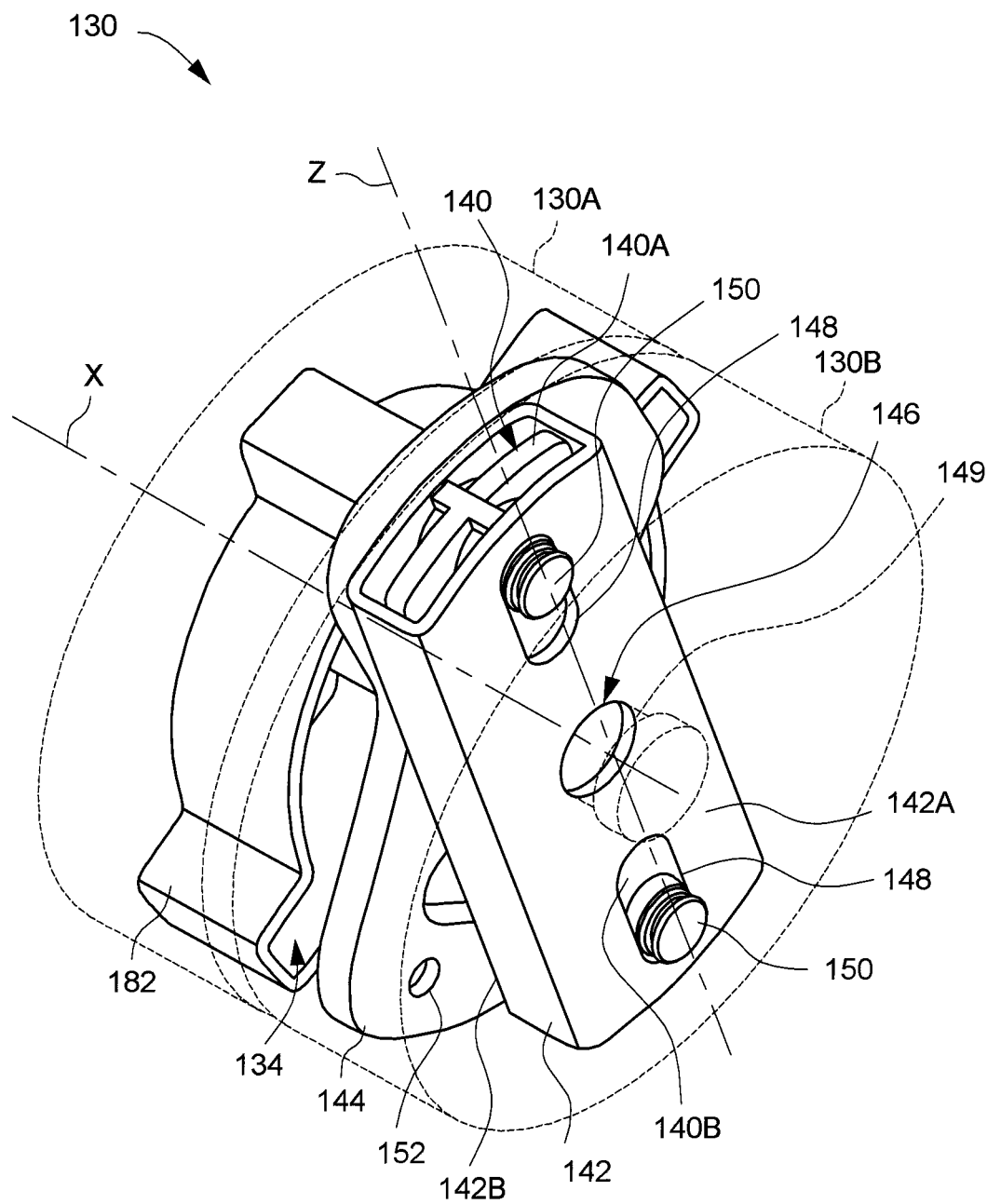
FIG. 4 is a schematic view illustrating an embodiment of a handle adjusting mechanism implemented in the infant carrier apparatus shown in FIG. 1.

FIG. 4 is a schematic view illustrating the construction of the handle adjusting mechanism 130. For clarity, the outer contour of the first and second coupling elements 130A and 130B are drawn with dotted lines. The first and second coupling elements 130A and 130B can include hollow casing portions. An interior of the first coupling element 130A can have a recessed region 134 provided with a guide track 182. As shown, the guide track 182 can include a plurality of locking slots (better shown in FIG. 9) disposed in different radial directions relative to the pivot axis X. In turn, the interior of the second coupling element 130B can include a latch device 140, a housing 142 and a rotary plate 144. In one embodiment, the latch device 140 can include two movable latches 140A and 140B. However, alternate embodiments can also use one single latch (e.g., 140A or 140B).

The housing 142 can be used for movably assembling the latches 140A and 140B with the second coupling element 130B, such that the latches 140A and 140B can slide relative to the second coupling element 130B. The housing 142 can be a hollow case in which the latches 140A and 140B are movably mounted. The housing 142 has a first surface 142A oriented toward the second coupling element 130B, and an opposite second surface 142B oriented toward the first coupling element 130A and adjacently facing the rotary plate 144. The first surface 142A of the housing 142 includes a hole 146, and two elongated slots 148 placed at two opposite sides of the hole 146. An interior of the second coupling element 130B includes a protruding axle 149 (shown with dotted lines in FIG. 4) that can pass through the hole 146 for defining a pivot axis X. In addition, one side of each latch 140A, 140B also includes a protruding key 150. When the latches 140A and 140B are assembled in the housing 142, the protruding keys 150 can be respectively guided through the elongated slots 148 in a movable manner. As a result, rotation of the rotary plate 144 can drive the latches 140A and 140B to slide parallel to a latch axis Z defined by the elongated slots 148 and in opposite radial directions relative to the pivot axis X, the latch axis Z being in a plane substantially perpendicular to the pivot axis X.

Figure 5:
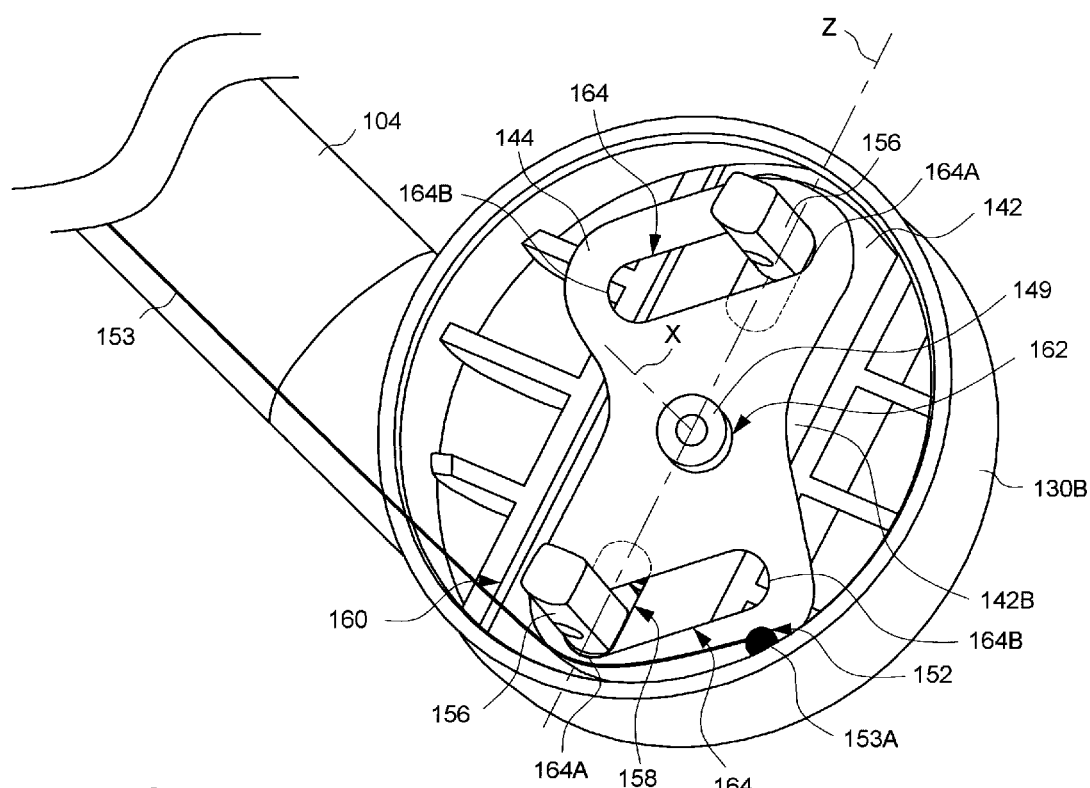
FIG. 5 is a schematic view illustrating the assembly of a rotary plate, a housing and a latch device in a second coupling element of the handle adjusting mechanism.
Figure 6:
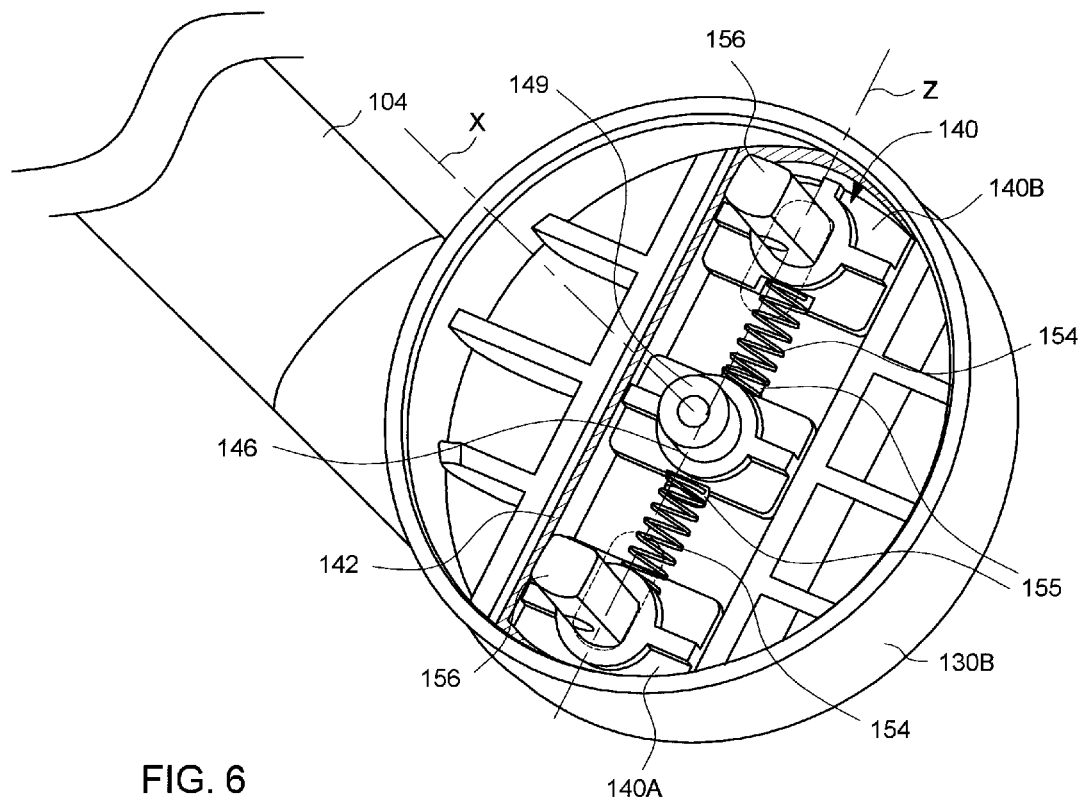
FIG. 6 is a schematic view illustrating the latch device in more details.

FIG. 5 is a schematic view illustrating the assembly of the rotary plate 144 and the housing 142 provided with the latches 140A and 140B in the second coupling element 130B. FIG. 6 is a schematic view that omits the second surface 142B of the housing 142 for more clearly showing the assembly of the latches 140A and 140B in the housing 142. Referring to FIGS. 4, 5 and 6, the rotary plate 144 can rotate about the pivot axis X, and include a hole 152 provided at an eccentric region distant from the pivot axis X for affixing a distal end of the transmission element 153 (as shown in FIG. 5). Being assembled parallel to the latch axis Z on opposite sides of the pivot axis X, the latches 140A and 140B can slide along opposite radial directions relative to the pivot axis X.

In addition to the latches 140A and 140B, the latch device 140 also comprises spring elements 154 respectively mounted between the hole 146 and each of the latches 140A and 140B. For example, a first end of one spring element 154 can be connected with either of the latches 140A and 140B, and a second end of the spring element 154 can be connected with a rib 155 provided in the housing 142 adjacent to the hole 146. Accordingly, the latches 140A and 140B and the spring elements 154 can respectively move and deform substantially parallel to the latch axis Z. For guiding the movement of the latches 140A and 140B relative to the housing 142, a side of the latches 140A and 140B opposite to the protruding keys 150 can also include engagement pins 156 that are guided and protrude through elongated slots 158 formed on the second surface 142B of the housing 142.

The housing 142 provided with the latches 140A and 140B can be placed in an inner cavity 160 of the second coupling element 130B. The axle 149 can pass through the hole 146 of the housing 142, and protrude through the second surface 142B of the housing 142.

The rotary plate 144 can include a hole 162, and two first guide slots 164 placed on two opposite sides of the hole 162. The first guide slots 164 can have an elongated shape including a first end 164A and a second end 164B. The first guide slots 164 can be arranged parallel to each other and inclined an angle relative to the latch axis Z, such that the distance between the first end 164A and the pivot axis X is greater than the distance between the second end 164B and the pivot axis X. When the rotary plate 144 is assembled on the second surface 142B of the housing 142, the axle 149 can pass through the hole 162 of the rotary plate 144, and the engagement pins 156 of the latches 140A and 140B can be respectively guided through the first guide slots 164, as shown in FIG. 5.

FIG. 7 is a schematic view illustrating the symmetrical connection between the release actuator 132 and the handle adjusting mechanisms 130. The transmission elements 153 can be cable transmission elements made of metallic cables, cords, ropes and the like, that are placed along an interior of the handle assembly 104. Each of the transmission elements 153 can be associated with one handle adjusting mechanism 130. More specifically, each transmission element 153 can have a first distal end 153A securely engaged with the hole 152 in the rotary plate 144 of the associated handle adjusting mechanism 130, and a second distal end 153B commonly connected with the release actuator 132.

The release actuator 132 can be arranged on the transverse segment 104A of the handle assembly 104. In one embodiment, the release actuator 132 can exemplary include a housing 170 and a button 172. The housing 170 can include an opening 174 and two elongated slots 176 spaced apart from each other and linearly aligned along their length axis.

The button 172 can include two second guide slots 178 placed at positions respectively corresponding to the elongated slots 176, and inclined relative to the elongated slots 176. The button 172 can be movably assembled with the housing 170, such that a portion of the button 172 protrudes through the opening 174 and the second guide slots 178 respectively overlap at least partially with the elongated slots 176.

Referring again to FIG. 7, the release actuator 132 can be respectively connected with the rotary plates 144 of the handle adjusting mechanisms 130 via the two transmission elements 153. In one embodiment, the first and second distal ends 153A and 153B can be provided with pins or rivet elements for connecting the transmission elements 153. In this manner, each transmission element 153 can have the first distal end 153A anchored at the position of the hole 152 of one associated rotary plate 144 (as better shown in FIG. 4), and the second distal end 153B movably guided through one corresponding second guide slot 178 of the button 172 and one corresponding elongated slot 176 of the housing 170. Through the connection of the transmission elements 153, the release actuator 132 can be operable to concurrently switch the two handle adjusting mechanisms 130 from the locked to unlocked state.

In FIG. 7, the latches 140A and 140B are shown at locking positions away from the pivot axis X under the biasing action exerted by the spring elements 154 (as shown in FIG. 6). Moreover, the button 172 protrudes through the opening 174 of the housing 170. In this configuration, the engagement pins 156 are respectively adjacent to the first distal ends 164A of the first guide slots 164.

Figure 8:
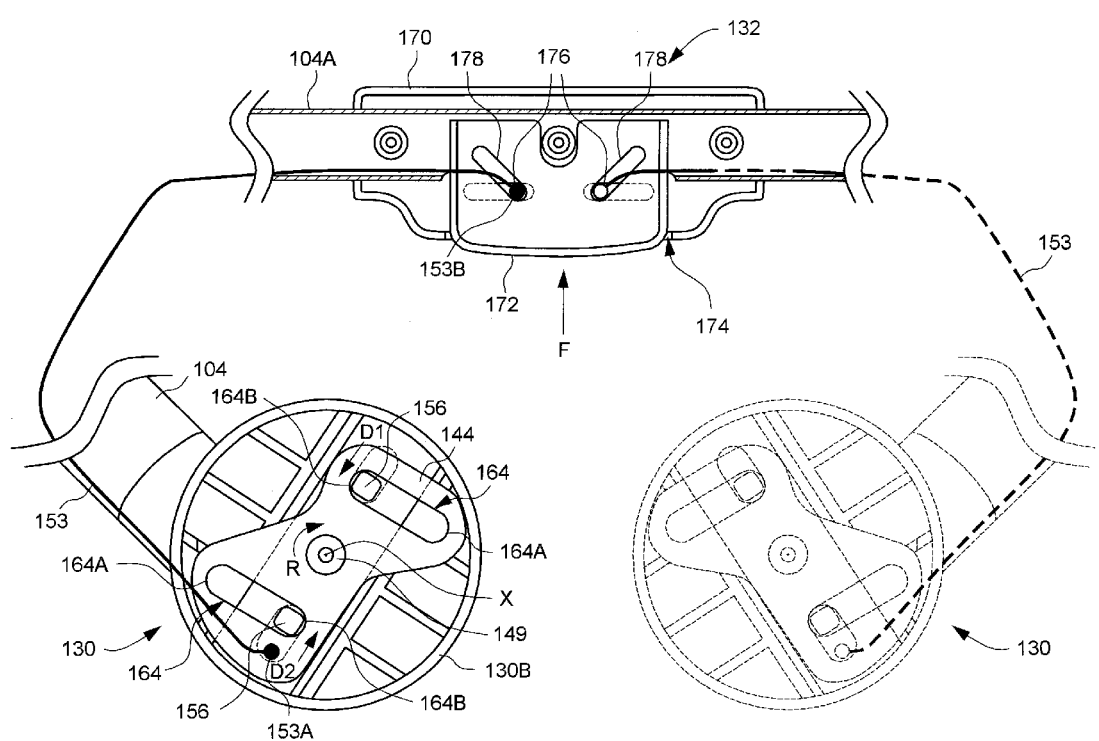
FIG. 8 is a schematic view illustrating the operation of the release actuator and the handle adjusting mechanisms.

Referring to FIG. 8, when the button 172 is depressed by application of a pressing force F, the button 172 can drive the second distal ends 153B of the transmission elements 153 to slide along the elongated slots 176 toward each other owing to the movable connection of the engagement pins 156 through the second guide slots 178 and elongated slots 176. The transmission elements 153 can thereby pull the rotary plates 144 (which are symmetrically disposed on the left and right sides) to rotate about the pivot axis X of the axle 149 in a same direction R. Owing to the movable connection of the engagement pins 156 through the first guide slots 164, the rotation of the rotary plates 144 in the direction R can cause the latches 140A and 140B to respectively slide in the radial directions D1 and D2 toward the pivot axis X and reach the unlocked positions shown in FIG. 8. In the unlocked positions, the engagement pins 156 of the latches 140A and 140B are respectively adjacent to the second ends 164B of the first guide slots 164. Because the respective radial distances between the pivot axis X and the latches 140A and 140B are shorter in the unlocked positions than in the locked positions, the spring elements 154 are compressed and loaded in the unlocked positions.

When the button 172 is released, the spring elements 154 can bias the latches 140A and 140B in opposite radial directions away from the pivot axis X, causing the rotary plate 144 to rotate in a reverse direction to recover the locked state shown in FIG. 7.

Figure 9:
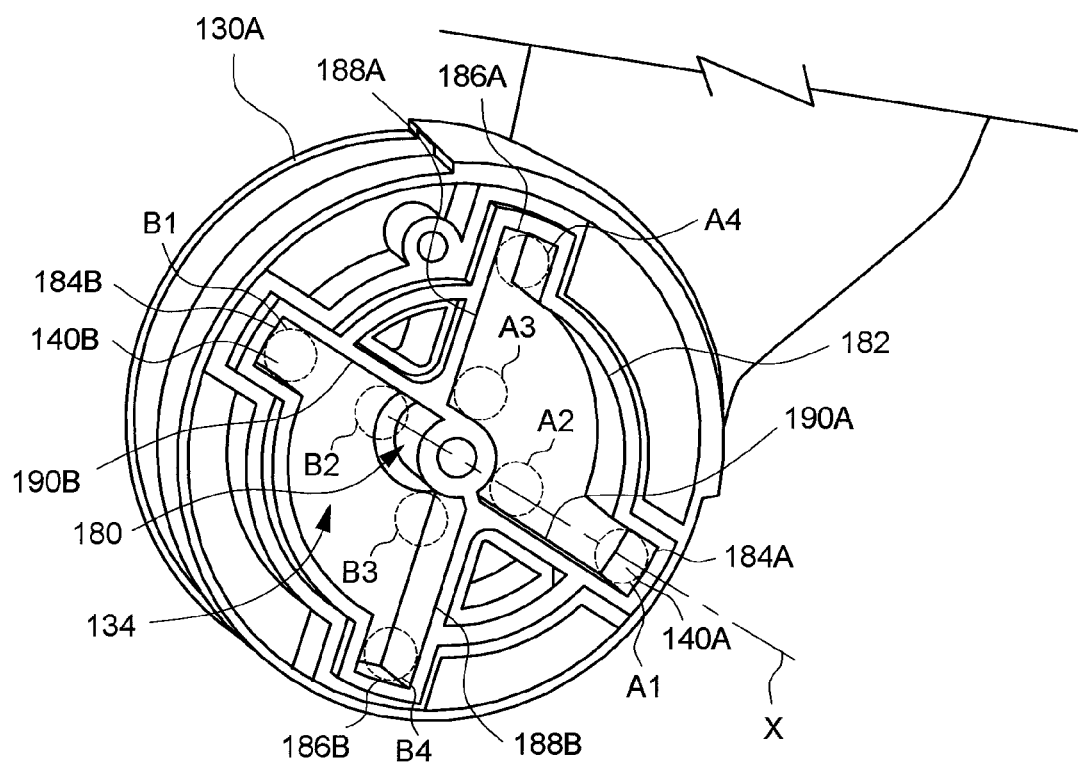
FIG. 9 is a schematic view illustrating the structure of a first coupling element of the handle adjusting mechanism.

FIG. 9 is a schematic view illustrating the inner structure of the first coupling element 130A. The recessed region 134 of the first coupling element 130A can include a central hole 180, and the guide track 182. In one embodiment, the guide track 182 can be delimited by an enclosure made of a metallic material such as aluminum, stainless steel. In alternate embodiment, the guide track 182 may also be directly delimited by raised sidewalls of the recessed region 134 without the need of additional rigid enclosure.

The guide track 182 can include a plurality of locking slots 184A, 184B, 186A and 186B disposed at different radial directions. In particular, the locking slots 184A and 184B can be arranged at two diametrically opposite positions relative to the central hole 180, whereas the locking slots 186A and 186B can be arranged at two other diametrically opposite positions relative to the central hole 180. The latches 140A and 140B of the latch device 140 can respectively engage with the locking slots 184A and 184B for holding the handle assembly 104 at a first position, and with the locking slots 186A and 186B for holding the handle assembly 104 at a second position. Accordingly, the arc angle defined between the direction of the locking slots 184A and 184B and the direction of the locking slots 186A and 186B can define the range of rotation for adjustment of the handle assembly 104 between the first and second position. Moreover, the recessed region 134 can also include end stops 188A and 188B that respectively extend in the radial directions of the locking slots 186A and 186B, and end stops 190A and 190B that respectively extend in the radial directions of the locking slots 184A and 184B. The end stops 188A, 188B, 190A and 190B, which may be formed by ribs, protrusions and the like, can be used for delimiting the range of adjustment of the handle assembly 104.

When the first and second coupling elements 130A and 130B are assembled together, the axle 149 of the second coupling element 130B can pass through the hole 180, such that the second coupling element 130B can rotate about the pivot axis X relative to the first coupling element 130A. The engagement pins 156 of the latches 140A and 140B can be received in the guide track 182 of the recessed region 134, and move to different locked positions A1, B1, A4 and B4 and unlocked positions A2, B2, A3 and B3 as the handle adjusting mechanisms 130 is operated.

Exemplary operation of the handle adjusting mechanism 130 is described hereafter with reference to FIGS. 2, 3, 7, 8 and 9. First, referring to FIGS. 2, 7 and 9, the handle assembly 104 can be initially inclined toward the first side 100A of the infant carrier apparatus 100. In this configuration, the latches 140A and 140B can be respectively biased by the spring elements 154 to the locked positions A1 and B1 in engagement with the locking slots 184A and 184B (i.e., corresponding to the configuration shown in FIG. 7). Accordingly, the handle adjusting mechanisms 130 can securely lock the handle assembly 104 in the inclined position shown in FIG. 2.

Next referring to FIGS. 3, 8 and 9, when the handle assembly 104 is to be adjusted, the button 172 can be depressed with one hand for applying the pressing force F. Being depressed, the button 172 can drive the rotary plates 144 in rotation via the transmission elements 153, which in turn causes the latches 140A and 140B to move in radial directions toward the pivot axis X. The latches 140A and 140B can thereby shift from the locked positions A1 and B1 to the unlocked positions A2 and B2 (i.e., corresponding to the configuration shown in FIG. 8) disengaged from the locking slots 184A and 184B, respectively. In this manner, the handle adjusting mechanisms 130 on the left and right sides of the support frame 102 can be switched to the unlocked state in a concurrent manner.

As shown in FIG. 2, the handle assembly 104 then can be rotated about the pivot axis X to the second side 100B, for example. As the handle assembly 104 rotates, the second coupling element 130B and the latch device 140 in each handle adjusting mechanism 130 also rotate in a same direction relative to the pivot axis X. As a result, the latches 140A and 140B are displaced from the unlocked positions A2 and B2 to the positions A3 and B3 in contact against the end stops 188A and 188B, respectively. Because the engagement pins 156 remain in contact with the second ends 164B of the first guide slots 164, the rotation of the latches 140A and 140B can also drive the rotary plate 144 to rotate concurrently in the same direction about the pivot axis X. When the handle assembly 104 reaches the desired position inclined toward the second side 100B of the infant carrier apparatus 100, the engagement pins 156 can respectively abut against the end stops 188A and 188B, which blocks further rotation of the handle assembly 104.

After the button 172 is released, the spring elements 154 can urge the latches 140A and 140B to move from the unlocked positions A3 and B3 to the locked positions A4 and B4 in engagement with the locking slots 186A and 186B. As the latches 140A and 140B move toward the locked positions A4 and B4, the rotary plates 144 are also driven in rotation in a direction opposite to the direction R, which in turn drives movement of the transmission elements 153 and pushes the button 172 toward the outside of the release actuator 132 to recover the configuration shown in FIG. 7. Accordingly, the handle adjusting mechanisms 130 can be effectively switched to the locked state in a concurrent manner for securely holding the handle assembly 104 in the desired position.

If the handle assembly 104 is to be reversely adjusted to the configuration shown in FIG. 2, the button 172 can be depressed to unlock the handle adjusting mechanisms 130 (i.e., by urging the latches 140A and 140B to move from the locked positions A4 and B4 to the unlocked positions A3 and B3). The handle assembly 104 can be then rotated toward the first side 100A of the infant carrier apparatus 100, which results in the latches 140A and 140B be shifted from the positions A3 and B3 to the positions A2 and B2 in abutment against the end stops 190A and 190B. Subsequently, the spring elements 154 can urge the latches 140A and 140B to move from the positions A2 and B2 to the locked positions A1 and B1 in engagement with the locking slots 184A and 184B.

At least one advantage of the structures described herein is the ability to use one single hand for operating the release actuator for unlocking the handle adjusting mechanisms in a concurrent manner. As a result, adjustment of the handle assembly can be more convenient to operate.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. An infant carrier apparatus comprising:
a support frame;
a handle assembly having two side segments;
two handle adjusting mechanisms pivotally connecting the two side segments of the handle assembly with the support frame, wherein each of the handle adjusting mechanisms has a locked state for securely holding the handle assembly in place relative to the support frame, and an unlocked state allowing rotation of the handle assembly about a pivot axis relative to the support frame;
two transmission elements, wherein each of the transmission elements has a first and second distal end, the first distal end being connected with one of the handle adjusting mechanisms; and
a release actuator connected with the second ends of the transmission elements, wherein the release actuator is operable to switch the handle adjusting mechanisms from the locked state to the unlocked state;
wherein each of the handle adjusting mechanisms includes:
a first and a second coupling element pivotally assembled with each other; and
a latch device operable to lock the first coupling element with the second coupling element, thereby blocking rotation of the handle assembly relative to the support frame, the latch device including:
two latches movably assembled at two radially opposite sides of the pivot axis, wherein the latches are driven in movement toward the pivot axis when the handle adjusting mechanisms are switched from the locked state to the unlocked state.

2. The apparatus according to claim 1, wherein the second coupling element includes a housing in which the two latches are movably assembled.

3. The apparatus according to claim 1, wherein the latches are placed in the second coupling element, the first coupling element includes a plurality of locking slots distributed radially relative to the pivot axis, and the latches engage with two diametrically opposite ones of the locking slots when the handle adjusting mechanisms are in the locked state.

4. The apparatus according to claim 3, wherein the first coupling element includes a guide track in which are defined the locking slots.

5. The apparatus according to claim 4, wherein the guide track includes at least one end stop against which one of the latches comes in abutment for limiting a range of rotation of the second coupling element relative to the first coupling element.

6. The apparatus according to claim 3, wherein each of the latches is connected with a spring element operable to bias the connected latch to engage with one corresponding locking slot.

7. The apparatus according to claim 3, wherein each of the handle adjusting mechanisms further comprises:
a rotary plate pivotally assembled about the pivot axis and having two first guide slots located on opposite sides relative to the pivot axis,
wherein the two latches are respectively assembled in a movable manner with the two first guide slots, and the rotary plate is connected with the first distal end of one transmission element, whereby when the release actuator is operated to pull on the transmission elements, the rotary plate is driven in rotation about the pivot axis to cause the two latches to disengage from the corresponding locking slots.

8. The apparatus according to claim 7, wherein each of the first guide slots includes a first and second end, the second end being closer to the pivot axis than the first end.

9. The apparatus according to claim 7, wherein each of the latches includes an engagement pin movably assembled through one associated first guide slot of the rotary plate, the engagement pin being engaged with one corresponding locking slot of the guide track when the handle adjusting mechanisms are in the locked state.

10. The apparatus according to claim 7, wherein the transmission elements respectively drive the rotary plates in rotation to cause the latches to displace toward each other when the handle assembly is rotated about the pivot axis.

11. The apparatus according to claim 1, wherein the handle assembly includes a transverse segment connecting between the two side segments, and the release actuator is placed on the transverse segment.

12. The apparatus according to claim 1, wherein the release actuator comprises:
   a housing having two elongated slots;
   a button having two second guide slots;
   wherein the second distal ends of the transmission elements are respectively assembled in a movable manner through the elongated slots and the second guide slots, whereby the button is operable to pull the transmission elements in movement for switching the handle adjusting mechanisms from the locked state to the unlocked state.

13. The apparatus according to claim 1, wherein the infant carrier apparatus is a stroller, and the support frame includes front and rear leg frames having lower ends provided with a plurality of wheels.

14. The apparatus according to claim 13, wherein the handle adjusting mechanisms are connected with the front leg frame.

15. An infant carrier apparatus comprising:
   a support frame;
   a handle assembly having a side segment pivotally connected with the support frame about a pivot axis;
   a handle adjusting mechanism including:
      two coupling parts respectively assembled with the support frame and the side segment and pivotally connected with each other; and
      two latches assembled at two radially different positions relative to the pivot axis, wherein the latches are operable to lock each other the two coupling parts for blocking rotation of the handle assembly relative to the support frame in a locked state, and the latches are driven in radial movement relative to the pivot axis when the handle adjusting mechanism is switched from the locked state to an unlocked state for allowing rotation of the handle assembly relative to the support frame; and
   a release actuator operatively coupled with the handle adjusting mechanism via a transmission element, the release actuator being operable to switch the handle adjusting mechanism from the locked state to the unlocked state.

16. The apparatus according to claim 15, wherein the two coupling parts include a first and a second coupling part, the latches are placed in a housing portion of the second coupling part, the first coupling part includes a plurality of locking slots distributed radially relative to the pivot axis, and the latches respectively engage with two ones of the locking slots when the handle adjusting mechanism is in the locked state.

17. The apparatus according to claim 16, wherein the first coupling part includes a guide track in which are defined the locking slots, and the guide track includes at least one end stop against which one of the latches comes in abutment for limiting a range of rotation of the second coupling part relative to the first coupling part.

18. The apparatus according to claim 16, wherein each of the latches is connected with a spring element operable to bias the connected latch to engage with one corresponding locking slot.

19. The apparatus according to claim 16, wherein the handle adjusting mechanism further comprises:
   a rotary plate pivotally assembled about the pivot axis and having two first guide slots;
   wherein the two latches are respectively assembled with the two first guide slots, and the rotary plate is connected with an end of the transmission element, whereby when the release actuator is operated to displace the transmission element, the rotary plate is driven in rotation about the pivot axis to cause the two latches to disengage from the corresponding locking slots.

20. The apparatus according to claim 19, wherein each of the latches includes an engagement pin guided through one associated first guide slot of the rotary plate, the engagement pin being engaged with one corresponding locking slot of the guide track when the handle adjusting mechanism is in the locked state.

* * * * *